(12) United States Patent
Paredes et al.

(10) Patent No.: US 10,816,133 B1
(45) Date of Patent: Oct. 27, 2020

(54) TELESCOPING STRUCTURAL SUPPORT DEVICE

(71) Applicant: Advanced Mounting and Design, Inc., Anaheim, CA (US)

(72) Inventors: William Paredes, Santa Ana, CA (US); Amilcar Paredes, Jr., Santa Ana, CA (US)

( * ) Notice: Subject to any disclaimer, the term of this patent is extended or adjusted under 35 U.S.C. 154(b) by 0 days.

(21) Appl. No.: 16/427,824

(22) Filed: May 31, 2019

(51) Int. Cl.
 *E04C 3/30* (2006.01)
 *F16M 11/26* (2006.01)
(52) U.S. Cl.
 CPC ............... *F16M 11/26* (2013.01); *E04C 3/30* (2013.01)
(58) Field of Classification Search
 CPC .......................................................... E04C 3/30
 USPC ................................. 52/126.4, 126.7, 239, 64
 See application file for complete search history.

(56) References Cited

U.S. PATENT DOCUMENTS

| 2,763,342 | A | * | 9/1956 | French | E04B 2/825 |
| | | | | | 403/25 |
| 5,101,215 | A | * | 3/1992 | Creaser, Jr. | E04H 12/182 |
| | | | | | 343/883 |
| 5,642,589 | A | * | 7/1997 | Miron | E04H 3/26 |
| | | | | | 52/118 |
| 5,660,005 | A | * | 8/1997 | Tacoma | E04B 1/24 |
| | | | | | 52/222 |
| 5,683,129 | A | * | 11/1997 | Jensen | A01K 23/005 |
| | | | | | 294/1.5 |
| 8,826,629 | B1 | * | 9/2014 | Brindle | E04C 3/005 |
| | | | | | 52/126.7 |
| 2002/0050112 | A1 | * | 5/2002 | Koch | F16C 33/3856 |
| | | | | | 52/651.07 |
| 2008/0244996 | A1 | * | 10/2008 | Gillespie | E04G 25/061 |
| | | | | | 52/169.9 |
| 2011/0047900 | A1 | * | 3/2011 | Holmes | E04H 12/342 |
| | | | | | 52/173.1 |
| 2013/0239490 | A1 | * | 9/2013 | Peng | F16M 11/28 |
| | | | | | 52/111 |
| 2014/0174016 | A1 | * | 6/2014 | Diniz | E04C 3/30 |
| | | | | | 52/632 |
| 2015/0047538 | A1 | * | 2/2015 | Ergun | A47B 9/10 |
| | | | | | 108/147 |

* cited by examiner

*Primary Examiner* — Paola Agudelo
(74) *Attorney, Agent, or Firm* — The Myers Law Group

(57) ABSTRACT

A universal telescoping structural support device with a right side configuration, comprising a right female telescoping sleeve with a substantially rectangular shape that is open on one side; a right male telescoping sleeve with a substantially rectangular shape that is open on one side; wherein the male sleeve is configured to telescope in movement within and along a length of the female sleeve and wherein the female sleeve is configured to telescope in movement around and along a length of the male sleeve.

12 Claims, 14 Drawing Sheets

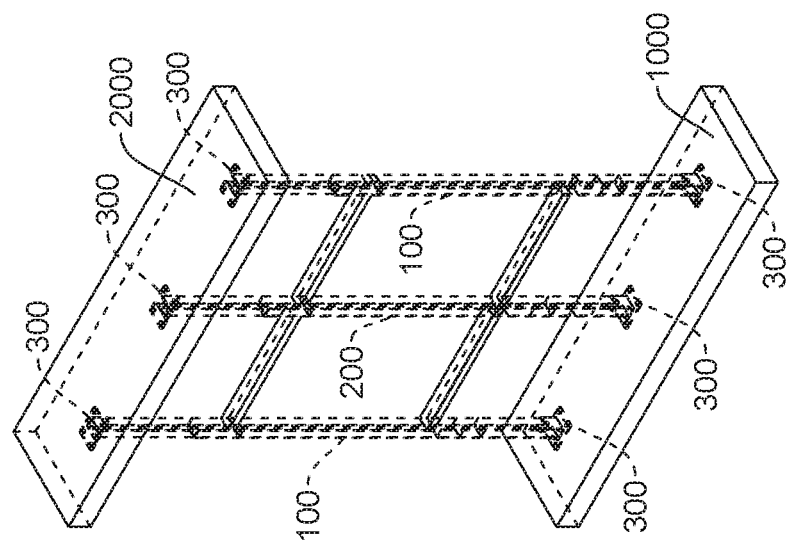
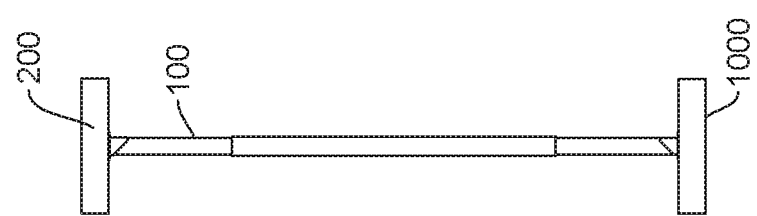
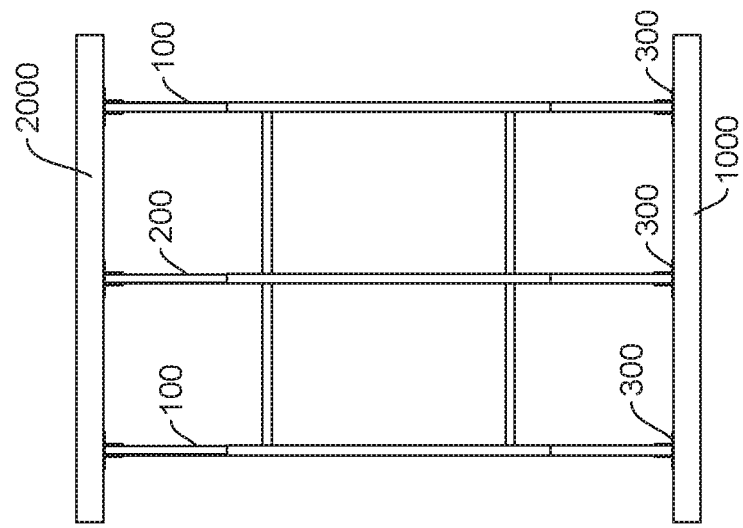

TELESCOPING STRUCTURAL SUPPORT DEVICE

BACKGROUND

The present disclosure relates generally to a universal telescoping structural support device, with left and right side configurations, that allows for a high level of precision, strength, and stability in its installation purposes. Other telescoping devices in the art are based on models and shapes that are inherently weak, subject to deformation, and/or that have limitations on their size and strength during installations and use. Further, other telescoping devices lack precision and stability in their telescoping abilities and positioning, with larger, less precise tolerances, such as +/−⅛ inch. Thus, there is a need for a telescoping structural support device with a wide range of applicability and with superior support capabilities, strength, and precision.

SUMMARY

A universal telescoping structural support device with a right side configuration, comprising a right female telescoping sleeve with a substantially rectangular shape that is open on one side; a right male telescoping sleeve with a substantially rectangular shape that is open on one side; wherein the male sleeve is configured to telescope in movement within and along a length of the female sleeve and wherein the female sleeve is configured to telescope in movement around and along a length of the male sleeve; wherein the rectangular shape of the right female sleeve further comprises a first and second side width of equal measurements, a first side length, a second side length, and an inner side width that is perpendicular to the two widths; and wherein the rectangular shape of the right male sleeve further comprises a first side width, a second side width, a first side length, a second side length, and an inner side width that is perpendicular to the two side widths.

A universal telescoping structural support device with a left side configuration, comprising a left female telescoping sleeve with a substantially rectangular shape that is open on one side; a left male telescoping sleeve with a substantially rectangular shape that is open on one side; wherein the male sleeve is configured to telescope in movement within and along a length of the female sleeve and wherein the female sleeve is configured to telescope in movement around and along a length of the male sleeve; wherein the rectangular shape of the left female sleeve further comprises a first and second side width of equal measurements, a first side length, a second side length, and an inner side width that is perpendicular to the two side widths; and wherein the rectangular shape of the left male sleeve further comprises a first side width, a second side width, a first side length, a second side length, and an inner side width that is perpendicular to the two side widths.

An installation for a universal telescoping structural support device, comprising a plurality of female telescopic sleeves that each telescopically couple to a male telescopic sleeve, wherein each telescopic sleeve is substantially rectangular in shape with one partially open side; a plurality of base plate pieces each configured to couple to a ground structure and one of the male telescopic sleeves, wherein each telescopic sleeve is substantially rectangular in shape with one partially open side; wherein each of the plurality of base plate pieces are coupled to the male telescopic sleeves via an adjustable bolt mechanism; wherein the female and male telescopic sleeves are configured in a vertical fashion and in a parallel arrangement to each other along the ground structure and corresponding base plate pieces; wherein the rectangular shape of the female sleeve further comprises a first and second side width of equal measurements, a first side length, a second side length, and an inner side width that is perpendicular to the two widths; and wherein the rectangular shape of the male sleeve further comprises a first side width, a second side width, a first side length, a second side length, and an inner side width that is perpendicular to the two side widths.

BRIEF DESCRIPTION OF THE SEVERAL VIEWS OF THE DRAWINGS

FIGS. 9A, 9B, and 9C depict front, side, and perspective view of the exemplary embodiment of the telescoping structural device installed as a rooftop support mount.

DESCRIPTION OF THE PREFERRED EMBODIMENTS

The detailed descriptions set forth below are intended as a description of embodiments of the invention, and is not intended to represent the only forms in which the present invention may be constructed and/or utilized. The descriptions set forth the structure and the sequence of steps for constructing and operating the invention. It is to be understood, however, that the same or equivalent structures and steps may be accomplished by different embodiments that are also intended to be encompassed within the spirit and scope of the invention.

Figure 1A:
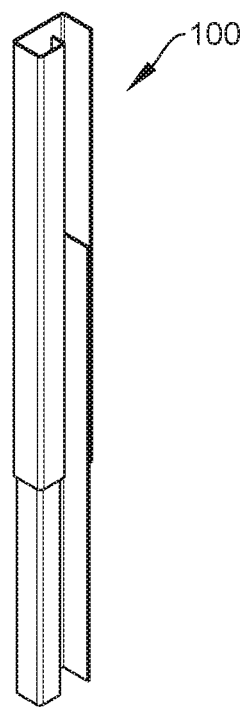
FIGS. 1(A) and (B) are perspective views of a female left hand side device and a male left hand side device shown coupled together and separately.
Figure 1B:
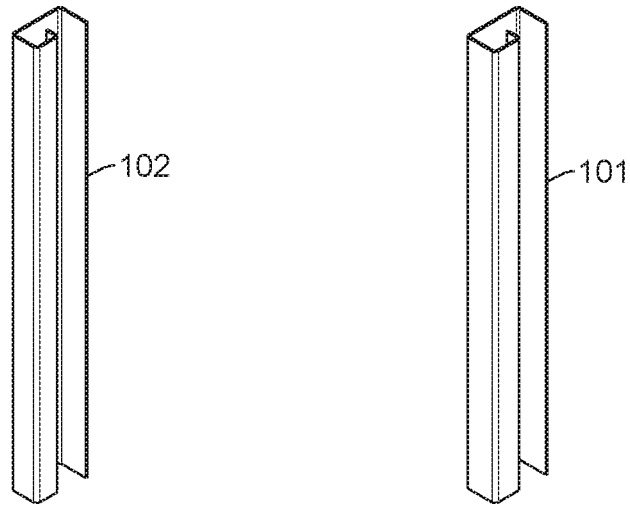

FIG. 1A depict a female and male left hand side telescoping structural support device 100 coupled together, each being substantially rectangular in shape with one partially open side. In this view, a female left hand side telescoping structural support sleeve 101 (also see FIG. 1B) is shown positioned along a length of a male left hand side telescoping structural support sleeve 102, which may be situated within the female left hand side sleeve 101 (also see FIG. 1B). Both female and male left hand side sleeves 101 and 102 can be telescopically positioned together, and adjusting or telescoping either female left hand side sleeve 101 or male left hand side sleeve 102 along each other lengths to position them as desired in their respective applications.

Figure 2A:
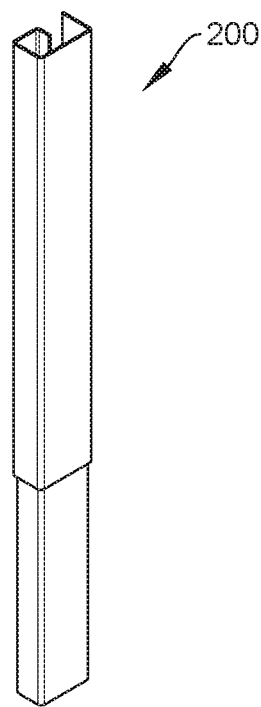
FIGS. 2(A) and (B) are perspective views of a female right hand side device and a male right hand side device shown coupled together and separately.
Figure 2B:
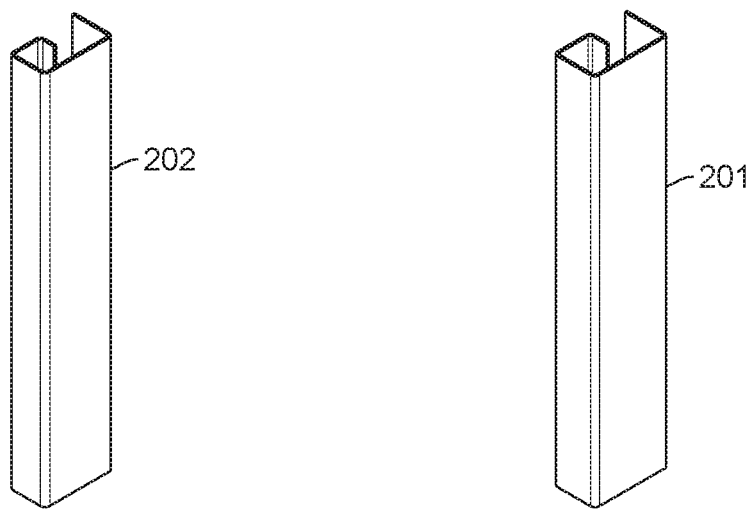

Similar to FIG. 1A, FIG. 2A depicts a female and male right hand side telescoping structural support sleeve 200, each being substantially rectangular in shape with one partially open side. A female right hand side telescoping structural support sleeve 201 (also see FIG. 2B) is shown positioned along a length of a male right hand side telescoping structural support sleeve 202, which may be situated within the female right hand side sleeve (also see FIG. 2B). Both female and male right hand side sleeves 201 and 202 can be telescopically positioned together, and adjusting or telescoping either female right hand side device 201 or male right hand side device 202 along each other lengths to position them as desired when in use.

Telescoping structural support devices 100 and 200 allow for a wide variety of applications, such as with different wall shapes, expandable structures, and the building of scalable walls and posts, including at the desired length and/or size. The exemplary embodiment of devices 100 and 200 may be comprised of 11 GA cold rolled steel. However, other materials and sheet metal, such as aluminum, galvanized steel, and stainless steel may be used to make sleeves 100 and 200 without deviating from the scope of the exemplary embodiment. Utilizing cold rolled steel allows for its properties relating to a fine finish, weldability, lightness, high tensile and yield strength, precise dimensions, and ability to maintain its form without shrinkage or changing form or appearance.

Figure 3:
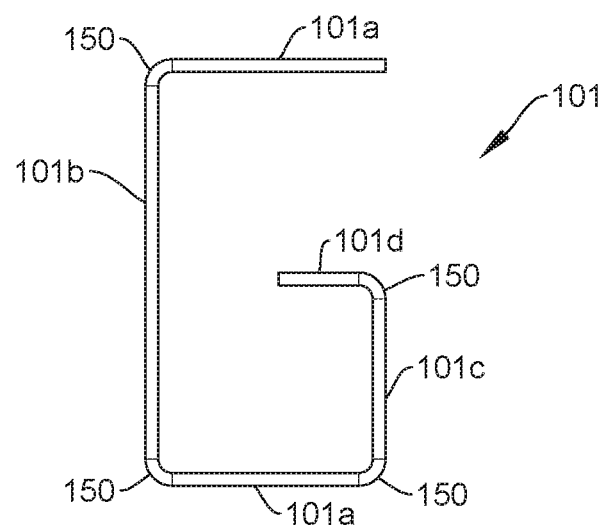
FIG. 3 is a cross-sectional view of the male and female left hand side devices.
Figure 3:
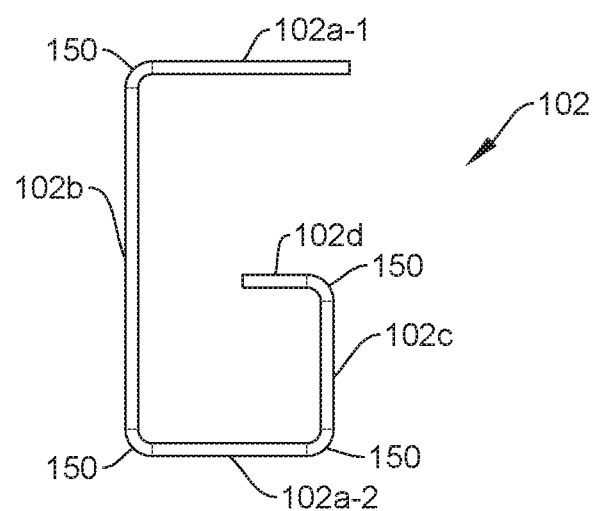

FIG. 3 depicts cross-sectional views of the female and male left hand side sleeves 101 and 102, both which may be shaped in a rectangular-like form. Female left hand side sleeve 101 may comprise five sides, which further comprise two widths 101*a*, a first length 101*b*, a second length 101*c*, and an inner width 101*d*. In the exemplary embodiment of device 100, inner width 101*d* is positioned perpendicular to second length 101*c* and parallel to widths 101*a*.

Similarly, the male left hand side device 102 may also comprise five sides, which further comprise a first width 102*a*-1, a second width 102*a*-2, a first length 102*b*, a second length 102*c*, and an inner width 102*d*. Inner width 102*d* may also be positioned perpendicular to second length 102*c* and parallel to first and second widths 102*a*-1 and 102*a*-2. Width 102*a*-2 may be shorter than 102*a*-1 as to allow male left hand side sleeve 102 telescope within female left hand side sleeve 101.

Figure 4:
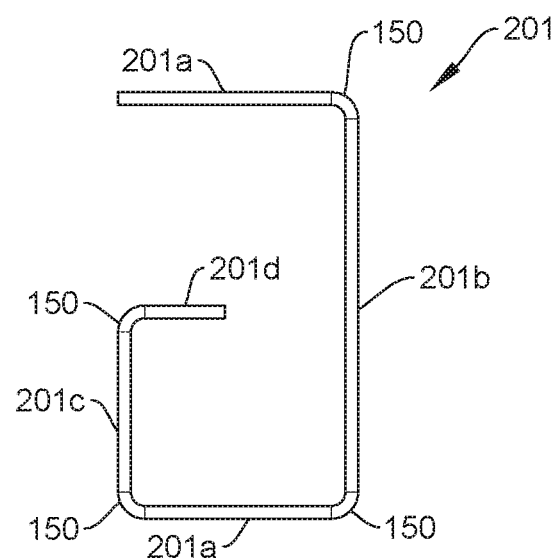
FIG. 4 is a cross-sectional view of the male and female right hand side devices.
Figure 4:
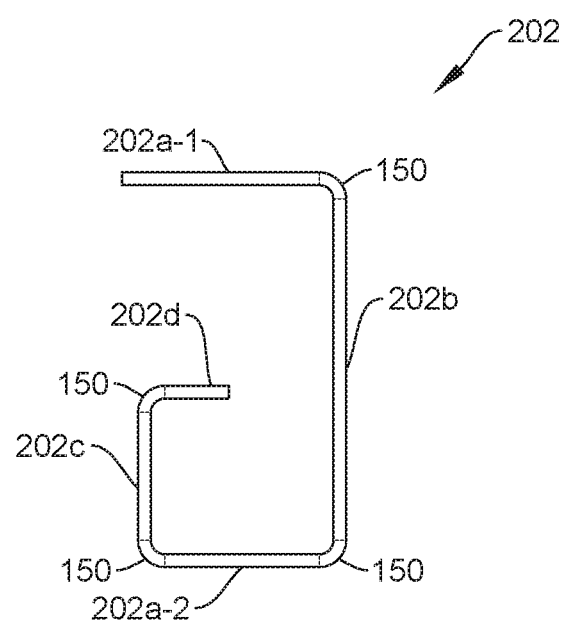

FIG. 4 depicts cross-sectional views of the female and male right hand side sleeves 201 and 202. Similar to sleeves 101 and 102, sleeves 201 and 202 are also rectangular-like in shape and form. Female right hand sleeve 201 may comprise five sides, which further comprise two widths 201*a*, a first length 201*b*, a second length 201*c*, and an inner width 201*d*. In the exemplary embodiment of device 200, inner width 201*d* is positioned perpendicular to second length 201*c* and parallel to widths 201*a*.

The male left hand side device 202 may also comprise five sides, which further comprise a first width 202*a*-1, a second width 202*a*-2, a first length 202*b*, a second length 202*c*, and an inner width 202*d*. Inner width 202*d* may also be positioned perpendicular to second length 202*c* and parallel to first and second widths 202*a*-1 and 202*a*-2. Width 202*a*-2 may be shorter than 202*a*-1 as to allow male left hand side sleeve 202 to telescope within female left hand side sleeve 201.

In an exemplary embodiment, the female left and right side sleeves 101 and 201 may contain the following measurements: widths 101*a* and 201*a* may be 2.25 inches; first lengths 101*b* and 201*b* may be 4 inches; second lengths 101*c* and 201*c* may be 2.0 inches; and inner widths 101*d* and 201*d* may be 1.0 inches. Male left and right side sleeves 102 and 201 may contain the following measurements: widths 102*a*-1 and 202*a*-1 may be 2.1 inches; widths 102*a*-2 and 202*a*-2 may be 1.95 inches; first lengths 102*b* and 202*b* may be 3.7 inches; second lengths 102*c* and 202*c* may be 1.7 inches; and inner widths 102*d* and 202*d* may be 0.85 inches. Varying smaller and larger dimensions and measurements may be utilized in connection with sleeves 101, 201, 102, and 202 without deviating in scope from the present embodiment.

Each sleeve 101, 102, 201, and 202 may have a plurality of corners/bends 150, such as four corners 150, with corners 150 connecting the first width to the first length, the first length to the second width, the second width to the second length, and the second length to the inner width. Each corner 150 is curved in shape, and may have an outer radius of ¼ inch, with each corner 150 having ten thousandths of an inch in precision when telescoping along its mate sleeve. Such precision allows for an enhanced and superior level of precision in the sleeves' telescoping properties, and allows the sleeves to hold tighter tolerances, such as +/−0.003 inches, for installation purposes.

Inner widths 101*d*, 102*d*, 201*d*, and 202*d* allow for additional layers of structural soundness, stability, precision, and strength for the telescoping and support properties of devices 100 and 200 during installation/use. In an exemplary embodiment, sleeves 101-102 and 201-202 may be manufactured to be approximately six feet in length and may be manufactured/pre-fabricated with CNC machinery. Such measurement allows for easier shipping and packing methods and means without limiting or diminishing the qualities, features, and support of the exemplary embodiment. Additionally, sleeves 101 and 102 as well as sleeves 201 and 202 may be telescopically adjusted along each other, respectively, with an insert length that can vary according to the particular structural support needed for an application.

Figure 5A:
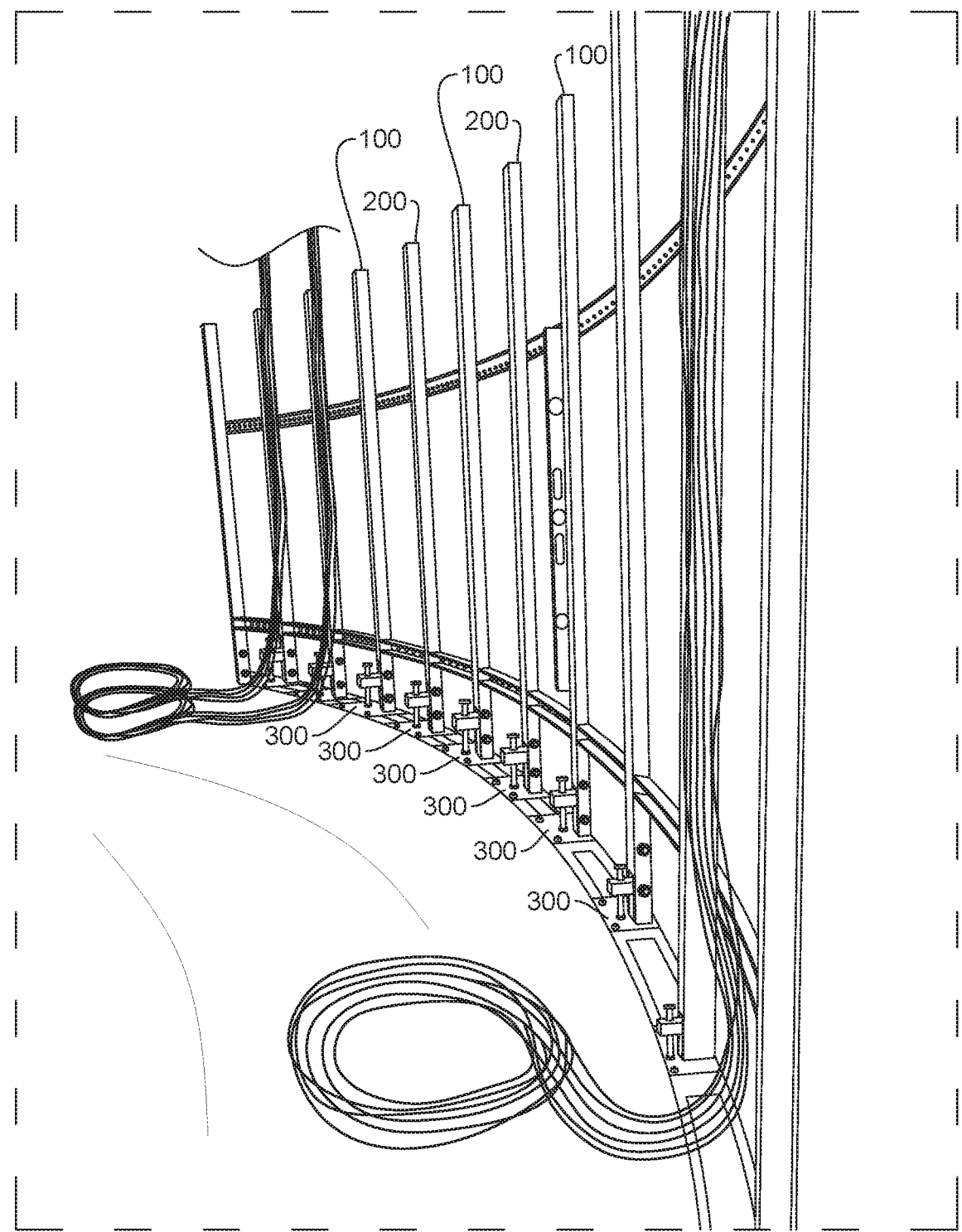
FIGS. 5(A) and (B) depict illustrations of the exemplary embodiment of the telescoping structural device installed in a curved arrangement for support of a large scale, wave-shaped television.

As explained earlier, telescoping structural support devices 100 and 200 may be used in a wide range of various types of settings and environments where structural support is needed or desired. FIG. 5A depicts devices 100 and 200 installed vertically along a long curved wall structure. Devices 100 and 200 may be used to provide such structural support on a large scale, such as for a big-screen, wave-shaped television (not shown). Devices 100 and 200 may be placed vertically and parallel to one another along the length of the wall structure with a 1-2 foot distance in between each device 100 and/or 200. Sleeves 101 and 102 and/or sleeves 201 and 202, as the case may be, may be telescoped and adjusted vertically to the desired installation height. Once the desired height of sleeves 101 and 102 and/or sleeves 201 and 202 is obtained, the respective sleeves can be bolted together (See FIGS. 6 and 7 for further details). As an example, a bolt or other securing mechanism may be inserted through the first side length of either the male/female sleeve and through to the second length. Other arrangements for bolting and securement may be utilized depending on installation needs. The male or female sleeve positioned at the bottom of the set-up, namely, at the floor level can be welded to a steel base and can be further secured with a jack bolt, such as a 24 thread per inch jack bolt. The jack bolt can be inserted into the flooring, ground, or other support platform/material until level, including along with the other devices 100 and 200 in the arrangement.

Figure 5B:
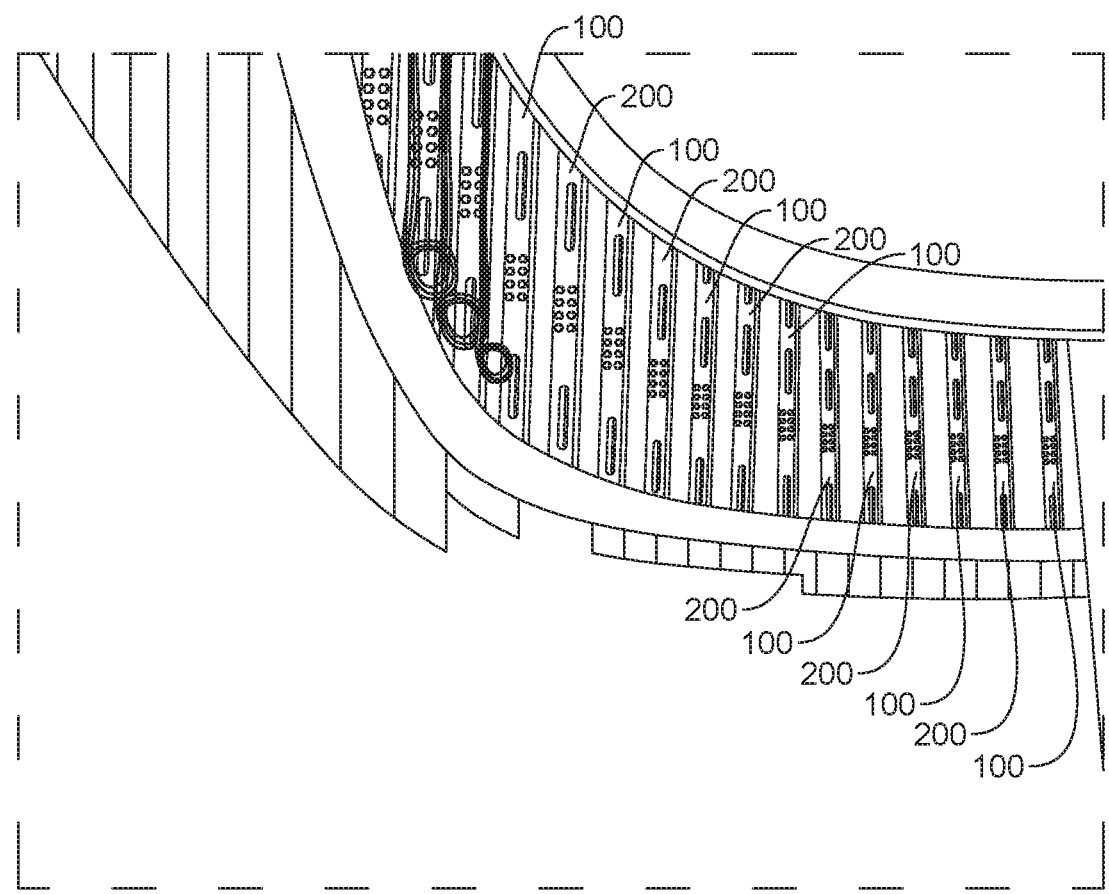

A leveling device can be used, such as the one shown in FIG. 5A, can be used to ascertain the accuracy of the vertical and horizontal positioning of devices 100 and 200 along the wall. The same positioning, set-up and securement may be utilized in connection with devices 100 and 200 shown in FIG. 5B. As will be discussed in further detail with respect to FIGS. 6 and 7, FIG. 5B also depicts the various shapes of holes that may be pre-formed in devices 100 and 200 during manufacture for purposes of securing sleeves 101/102 and sleeves 201/202 to each other as well as for securement of the particular device, structure, or other mechanisms for which devices 100 and 200 are being utilized to provide support.

Figure 6A:
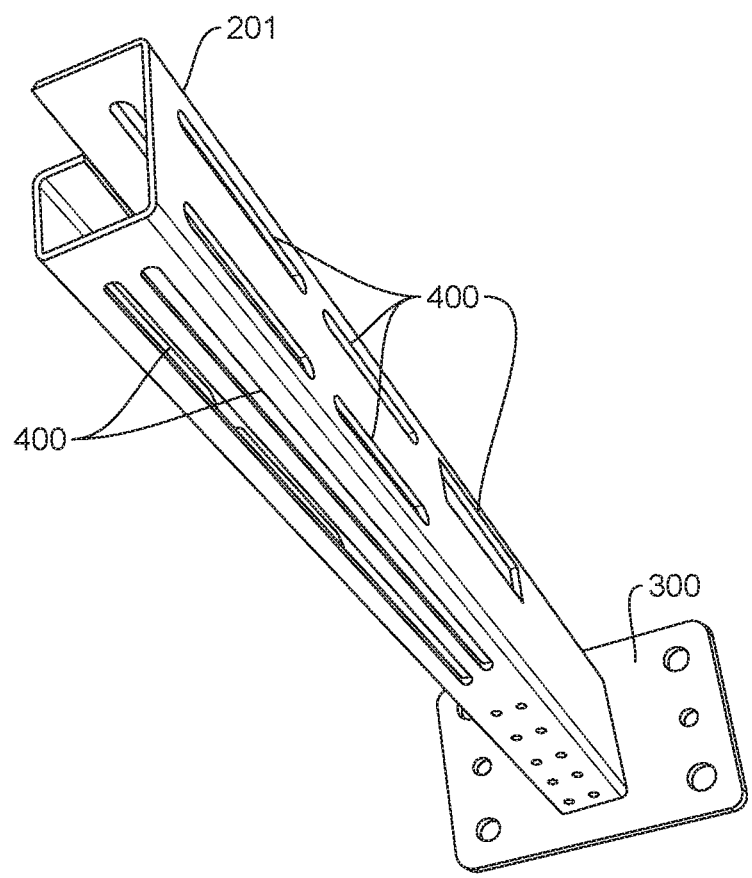
FIGS. 6(A) and (B) depict the front and back sides of the telescopic structural support device that may be welded to a base support device in such installation.
Figure 6B:
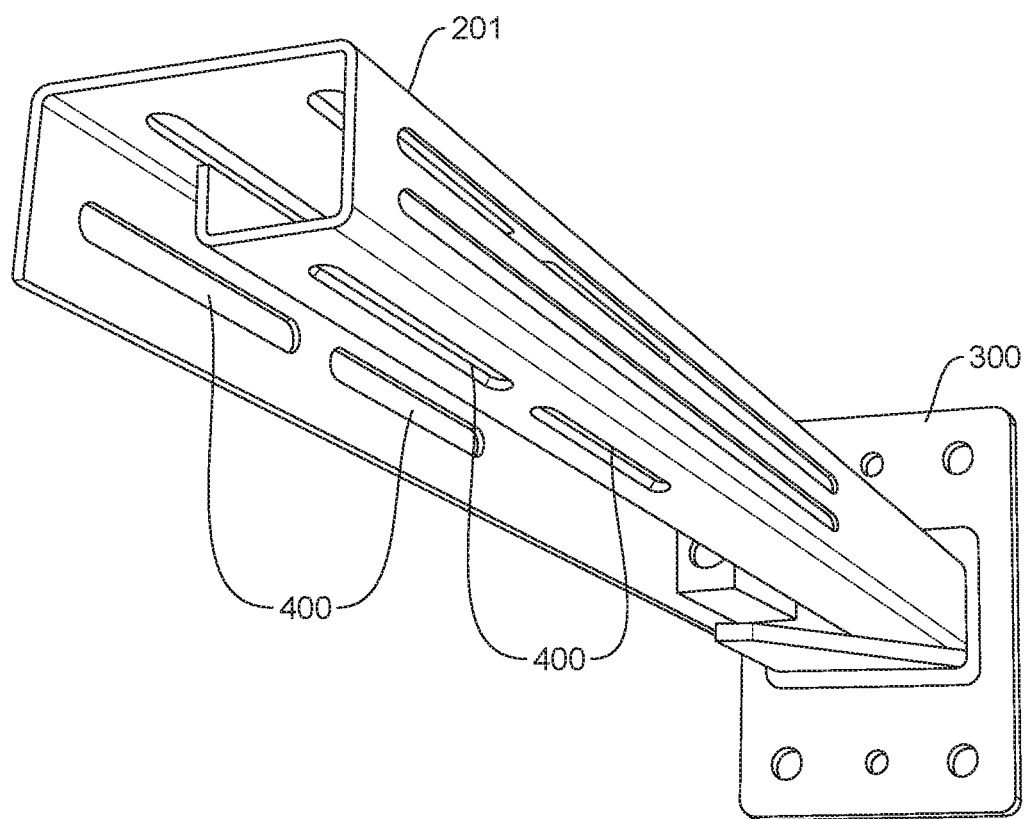

FIGS. 6A and 6B depicts perspective side views of a female right hand sleeve 201 coupled to a base plate piece 300 (the same may be implemented with respect to female left hand sleeve 101, or even male right and left hand sleeves 102 and 202). As mentioned earlier, female sleeves 101 and 201 may be welded to a base plate piece 300, such as a steel base plate. Base plate piece 300 may be pre-fabricated or manufactured so that it is outfitted to mate with a bottom piece of sleeve 101 or 201 (See FIG. 7D for further detail of bottom piece) before any welding, or similar process occurs.

Also shown in FIGS. 6A and 6B, are a number of pre-fabricated holes 400 of varying shapes positioned along widths 201a, first length 201b, and second length 201c. Holes 400 may be utilized to bolt sleeve 102 to sleeve 101 during installation and set-up. The varying shapes and lengths of holes 400, such as rectangles, circles, squares, and oblong rectangles, allow for flexibility in where a user decides to implement a bolting or securing mechanism, such as a Grade A bolt, depending on how the sleeves 101/102 and/or 201/202 are adjusted, positioned, and secured during installation.

Figure 7A:
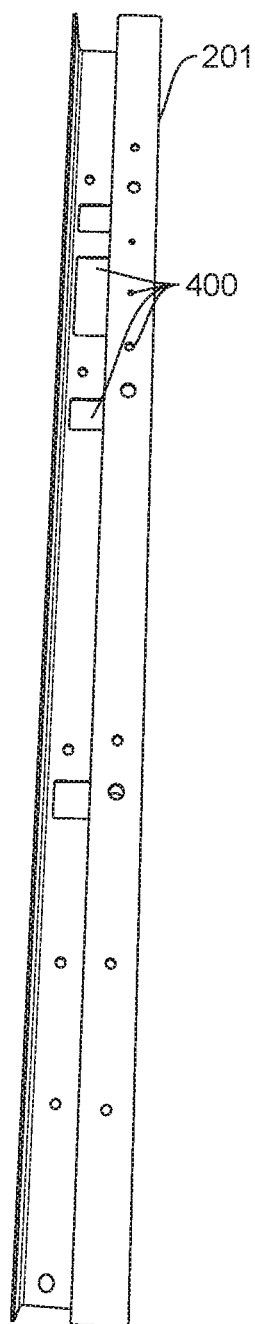
FIGS. 7(A), (B), (C), and (D) depict four views of the telescoping structural device pre-fabricated with various shapes of holes for multiple mounting options.
Figure 7B:
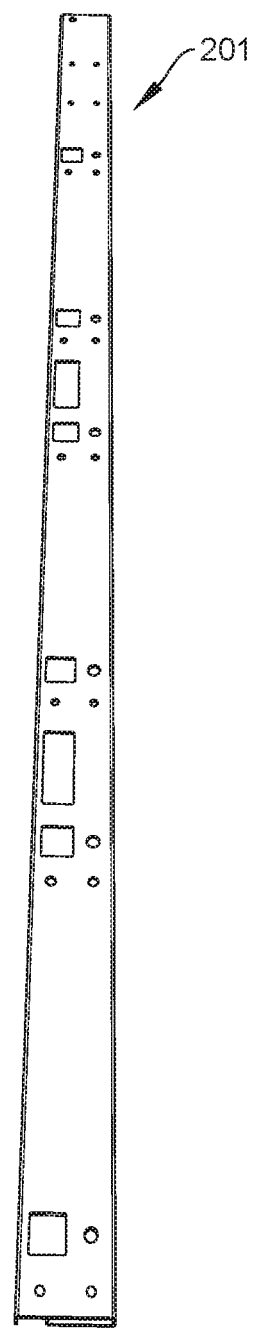
Figure 7C:
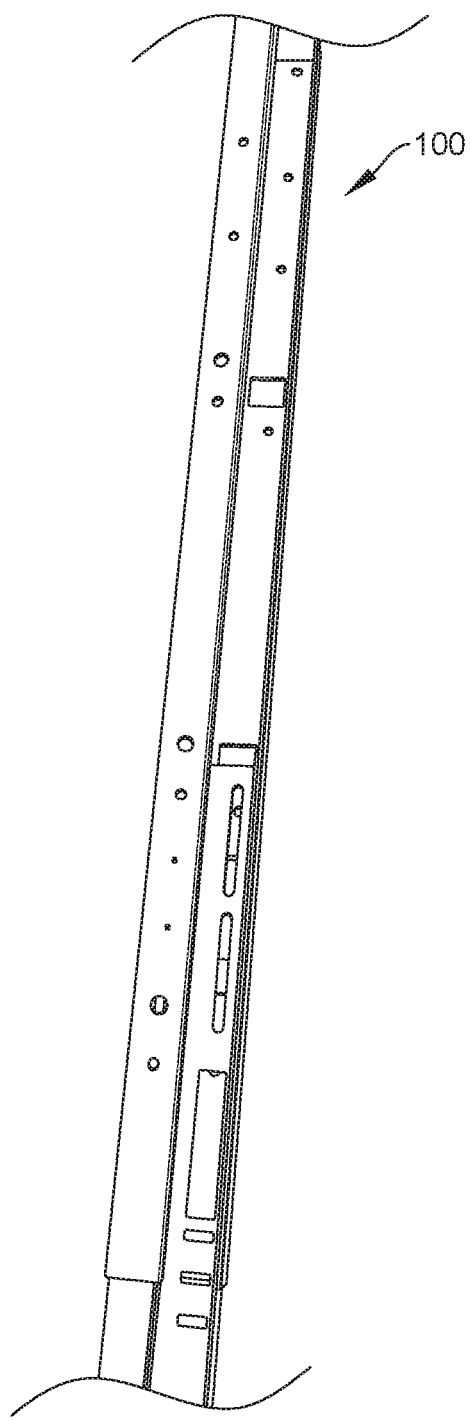
Figure 7D:
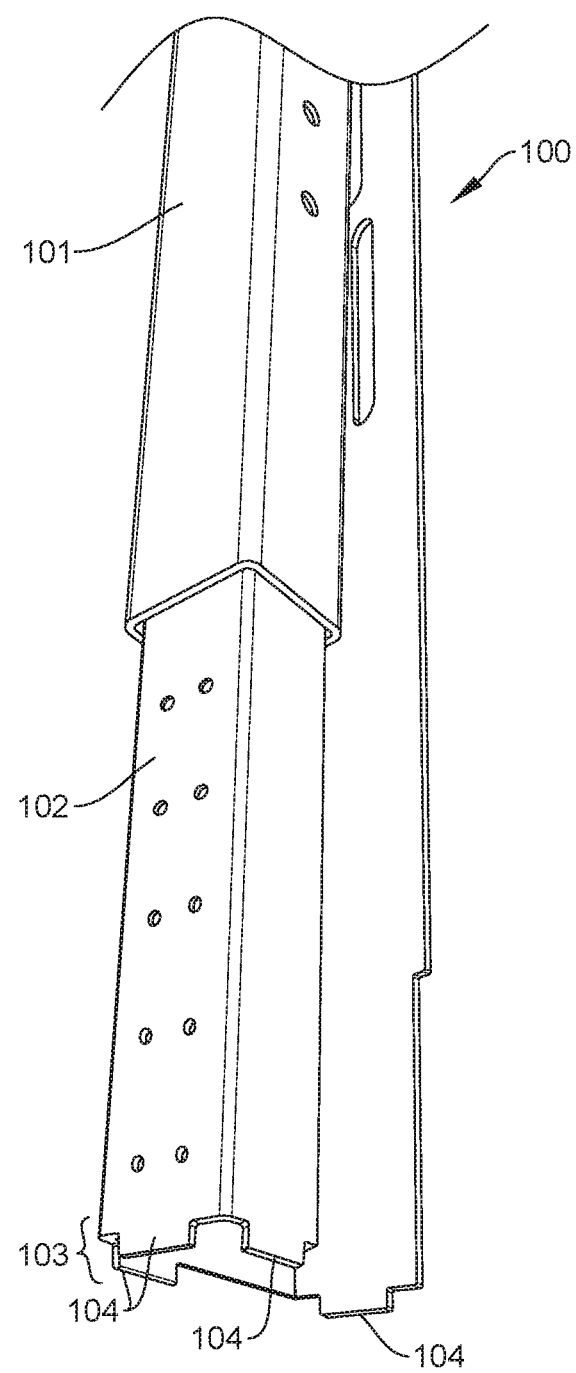

FIGS. 7A, 7B, 7C and 7D depicts various views of sleeves 201, 101, and 100, respectively, which also show the various pre-fabricated arrangements of holes 400. In particular, FIG. 7C shows device 100 and how the holes on sleeve 101 and 102 can telescope along each other and be adjusted as needed before securement of device 100. FIG. 7D depicts device 100 where sleeve 101 is positioned above a base area 103 (base area 203 with respect to device 200) of sleeve 102. Such base area 103 may further comprise one or more prongs 104, which may be rectangular in shape, and which may extend out from widths 102a-1, 102a-2, first length 102b, and second length 102c. Prongs 104 may be pre-fabricated to mate with base plate piece 300 in addition to welding base area 103/prongs 104 to base plate piece 300.

Figure 8:
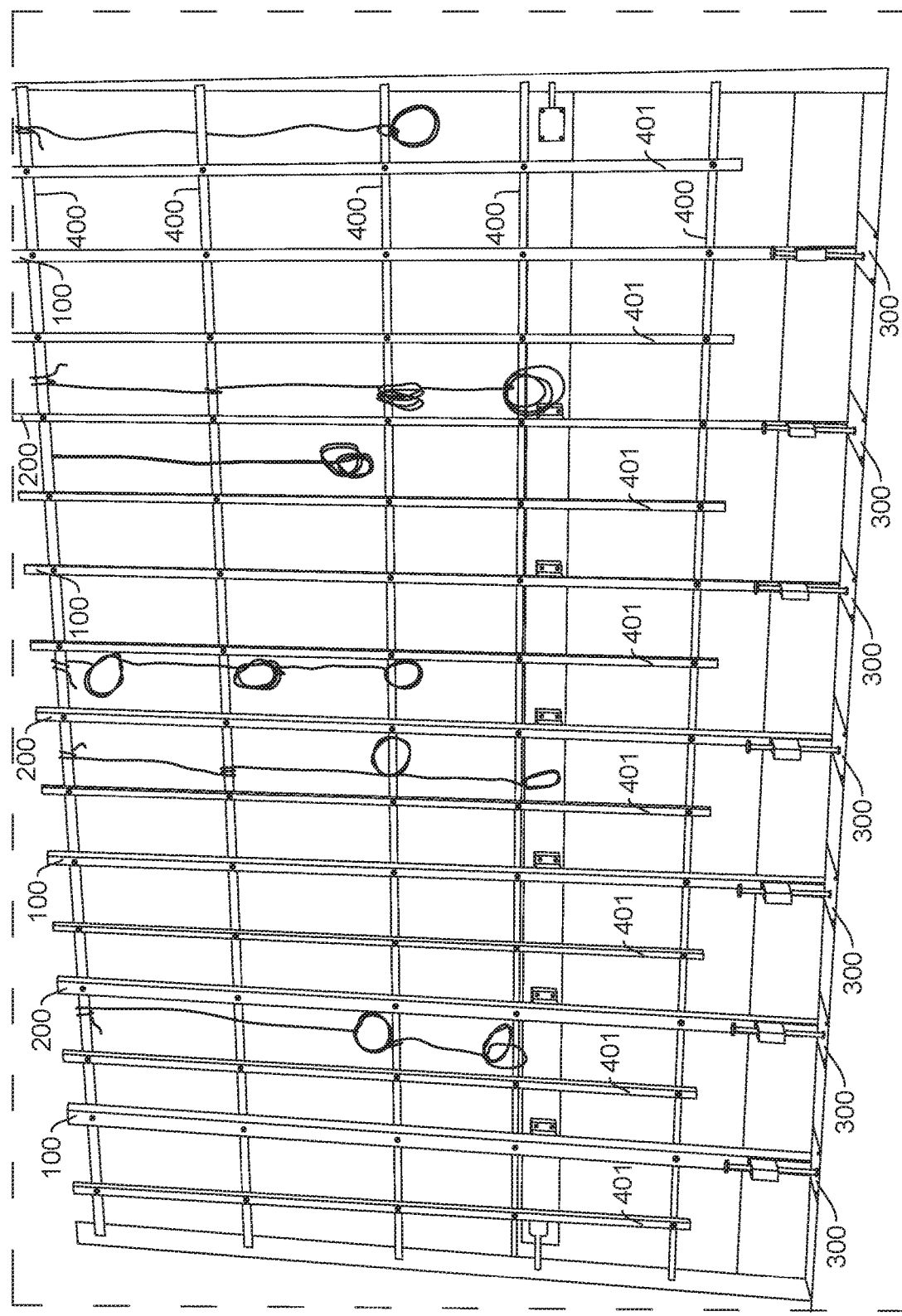
FIG. 8 depicts an illustrations of the exemplary embodiment of the telescoping structural device installed along a straight wall structure.

FIG. 8 depicts an illustrations of the exemplary embodiment of the telescoping structural devices 100/200 installed along a straight wall structure. As shown, each of devices 100 and 200 are connected to a base plate piece 300, including through use of a bolt, such as a jack bolt with 24 threads per inch. Devices 100 and 200 may also be outfitted with one or more horizontal support bars 400 to create a structural frame, as needed or desired in a particular application. In FIG. 8, a plurality of horizontal support bars 400 are utilized in incremental heights along the height of devices 100 and 200. Horizontal support bars 400 may be outfitted and/or secured with one or more vertical support bars 401 to allow for an additional layer of stability to the overall structural frame. Vertical support bars 401 may be connected to horizontal support bars 400 by a securing mechanism such as a bolt, drill, or other comparable mechanism. Furthermore, horizontal support bars 400 may also be used to provide an ancillary support platform for wiring and other such materials around devices 100 and 200.

FIGS. 9A, 9B, and 9C depict front, side, and perspective view of the exemplary embodiment of the telescoping structural device installed as a rooftop support mount. In this application, devices 100 and/or 200 may be installed so that each of its opposite ends are connected to a base plate piece 300, one plate 300 which is connected to a floor platform 1000 and another plate 300 which is connected to a ceiling and/or upper floor platform 2000.

In this application, male sleeve 102/202 may be connected to the base plate piece 300 which is attached to the ceiling/upper floor platform 2000, and female sleeve 101/201 may be connected to the base plate piece 300 which is attached to the floor platform 1000. The male sleeves 102/202 and female sleeves 101/201 allow for offsetting an earthquake force, or other disruptive force, applied to the structure at hand by telescoping in movement during such force. Such telescoping movement of sleeves 102/202 and sleeves 101/201 allows for flexibility in the surrounding structure during a disruptive force, and such sleeves 102/202 and 101/201 may be fastened to each other with a flexible mechanism, such as a spring device, to allow telescoping along a certain maximum length of sleeves 102/202 and sleeves 101/201, rather than a rigid mechanism, such as a bolt.

Various aspects of the present invention are described herein according to embodiments of the invention. While particular forms of the invention have been described, it will also be apparent to those skilled in the art that various modifications can be made without departing from the spirit and scope of the invention. Accordingly, it is not intended that the invention be limited except by the claims.

The invention claimed is:

1. A universal telescoping structural support device with a right side configuration, comprising:
   a right female telescoping sleeve that is substantially G-shaped further comprising five sides;
   a right male telescoping sleeve that is substantially G-shaped further comprising five sides;
   wherein the male sleeve is configured to telescope in movement within and along a length of the female sleeve and wherein the female sleeve is configured to telescope in movement around and along a length of the male sleeve;
   wherein the five sides of the G-shaped right female sleeve further comprises a first and second side width of equal measurements, a first side length, a second side length, and an inner side width that is parallel to the two widths, all of said lengths and widths of the right female sleeve are coupled to each other via four rounded corners; and
   wherein the five sides of the G-shaped right male sleeve further comprises a first side width, a second side width, a first side length, a second side length, and an inner side width that is parallel to the two side widths, all of said lengths and widths of the right male sleeve are coupled to each other via four rounded corners.

2. The universal telescoping structural support device of claim 1, wherein each rounded corner of the right female sleeve has an outer radius of ¼ inch.

3. The universal telescoping structural support device of claim 1, wherein each rounded corner of the right male sleeve has an outer radius of ¼ inch.

4. The universal telescoping structural support device of claim 1, wherein the second side length of the female sleeve is half the length of the first side length.

5. The universal telescoping structural support device of claim 1, wherein the second side length of the male sleeve is shorter in length than the second side length of the female sleeve.

6. The universal telescoping structural support device of claim 1, wherein the male and female sleeves are each six feet in length.

7. A universal telescoping structural support device with a left side configuration, comprising:
- a left female telescoping sleeve that is substantially G-shaped further comprising five sides;
- a left male telescoping sleeve that is substantially G-shaped further comprising five sides;
  - wherein the male sleeve is configured to telescope in movement within and along a length of the female sleeve and wherein the female sleeve is configured to telescope in movement around and along a length of the male sleeve;
  - wherein the five sides of the G-shaped left female sleeve further comprises a first and second side width of equal measurements, a first side length, a second side length, and an inner side width that is parallel to the two side widths, all of said lengths and widths of the left female sleeve are coupled to each other via four rounded corners; and
  - wherein the five sides of the G-shaped left male sleeve further comprises a first side width, a second side width, a first side length, a second side length, and an inner side width that is parallel to the two side widths, all of said lengths and widths of the left male sleeve are coupled to each other via four rounded corners.

8. The universal telescoping structural support device of claim 7, wherein each rounded corner of the left female sleeve has an outer radius of ¼ inch.

9. The universal telescoping structural support device of claim 7, wherein each rounded corner of the left male sleeve has an outer radius of ¼ inch.

10. An installation for a universal telescoping structural support device, comprising:
- a plurality of female telescopic sleeves that each telescopically couple to a male telescopic sleeve, wherein each telescopic sleeve is substantially G-shaped further comprising five sides;
- a plurality of base plate pieces each configured to couple to a ground structure and one of the male telescopic sleeves;
  - wherein each of the plurality of base plate pieces are coupled to the male telescopic sleeves via an adjustable bolt mechanism;
  - wherein the female and male telescopic sleeves are configured in a vertical fashion and in a parallel arrangement to each other along the ground structure and corresponding base plate pieces;
  - wherein the five sides of the G-shaped female sleeve further comprises a first and second side width of equal measurements, a first side length, a second side length, and an inner side width that is parallel to the two widths, all of said lengths and widths of the female sleeve are coupled to each other via four rounded corners; and
  - wherein the five sides of the G-shaped male sleeve further comprises a first side width, a second side width, a first side length, a second side length, and an inner side width that is parallel to the two side widths, all of said lengths and widths of the male sleeve are coupled to each other via four rounded corners.

11. The installation for a universal telescoping structural support device of claim 10, wherein the male and female telescopic sleeves further comprise a plurality of different shaped holes along a length of each the male and female sleeves.

12. The installation for a universal telescoping structural support device of claim 11, wherein the different shaped holes further comprise circles and oblong rectangles.

* * * * *